(12) United States Patent
Rogacs et al.

(10) Patent No.: US 12,487,234 B2
(45) Date of Patent: Dec. 2, 2025

(54) ANTIBODY FLUID DEPOSITS

(71) Applicant: Hewlett-Packard Development Company, L.P., Spring, TX (US)

(72) Inventors: Anita Rogacs, San Diego, CA (US); Fausto D'Apuzzo, Palo Alto, CA (US); Erica Squires, Corvallis, OR (US); Tynan Becker, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 802 days.

(21) Appl. No.: 17/781,462

(22) PCT Filed: Jan. 29, 2020

(86) PCT No.: PCT/US2020/015571
§ 371 (c)(1),
(2) Date: Jun. 1, 2022

(87) PCT Pub. No.: WO2021/154230
PCT Pub. Date: Aug. 5, 2021

(65) Prior Publication Data
US 2023/0003723 A1    Jan. 5, 2023

(51) Int. Cl.
*G01N 33/53* (2006.01)
*G01N 35/10* (2006.01)

(52) U.S. Cl.
CPC ..... *G01N 33/5304* (2013.01); *G01N 35/1009* (2013.01); *G01N 2035/1041* (2013.01)

(58) Field of Classification Search
None
See application file for complete search history.

(56) References Cited

U.S. PATENT DOCUMENTS

| | | | |
|---|---|---|---|
| 6,063,339 A * | 5/2000 | Tisone | B05B 1/3053 422/65 |
| 6,312,960 B1 | 11/2001 | Balch et al. | |
| 6,998,230 B1 * | 2/2006 | Schantz | B01J 19/0046 506/40 |
| 8,920,752 B2 * | 12/2014 | Tisone | C12M 41/00 506/37 |
| 10,295,544 B2 | 5/2019 | Zhang | |
| 10,330,675 B2 | 6/2019 | Liu | |
| 2002/0159919 A1 * | 10/2002 | Churchill | B05B 1/3053 436/180 |
| 2003/0143329 A1 * | 7/2003 | Shchegrova | G01N 35/1009 427/256 |
| 2003/0143756 A1 * | 7/2003 | Fisher | B01J 19/0046 435/6.19 |

(Continued)

FOREIGN PATENT DOCUMENTS

| | | |
|---|---|---|
| CN | 209148698 | 7/2019 |
| WO | 2014165185 | 10/2014 |

*Primary Examiner* — Brian R Gordon
(74) *Attorney, Agent, or Firm* — Foley & Lardner LLP (57) ABSTRACT

In one example an apparatus can include a controller communicatively coupled to a droplet dispenser to deposit antibody fluid on a matrix of an immunoblotting array, the controller is to align the droplet dispenser with a protein band included in the matrix, instruct the droplet dispenser to deposit a first antibody fluid on to the protein band of the matrix, and instruct the droplet dispenser to deposit a second antibody fluid on to the protein band of the matrix, adjacent to the first antibody fluid.

11 Claims, 6 Drawing Sheets

(56) References Cited

U.S. PATENT DOCUMENTS

| | | | |
|---|---|---|---|
| 2004/0086928 A1* | 5/2004 | Caren | B01L 3/0268 506/9 |
| 2005/0277122 A1* | 12/2005 | Fredrick | B01J 19/0046 435/287.2 |
| 2006/0051493 A1* | 3/2006 | Tella | B01J 19/0046 118/713 |
| 2006/0211132 A1* | 9/2006 | Miledi | B01L 3/0265 436/180 |
| 2008/0207461 A1* | 8/2008 | Ermantraut | B01J 19/0046 506/30 |
| 2013/0011880 A1* | 1/2013 | Barbee | G01N 35/0099 422/509 |
| 2013/0034869 A1 | 2/2013 | Whitesides et al. | |
| 2016/0216255 A1 | 7/2016 | Liu | |
| 2018/0156732 A1* | 6/2018 | Tajima | G01N 35/10 |
| 2019/0324028 A1 | 10/2019 | Fan et al. | |
| 2021/0123893 A1* | 4/2021 | Shkolnikov | G01N 21/65 |
| 2021/0252499 A1* | 8/2021 | D'Apuzzo | G01N 21/278 |

* cited by examiner

ANTIBODY FLUID DEPOSITS

BACKGROUND

Immunoblotting arrays such as Western blot, Southern blot, Northern blot, etc. can be used as analytical techniques and biological diagnostic tools, immunogenetics, and other biological disciplines to detect molecules such as proteins, DNA, RNA, etc. In some systems, multiple molecules (e.g., proteins) can be isolated for each sample assessed on an immunoblotting array. The molecule isolated by the immunoblotting array can be visualized through various methods such as staining, immunofluorescence, and/or radioactivity, among others.

DETAILED DESCRIPTION

Immunoblotting arrays such as Western blot can be used in the research of biological systems. Western blot can examine the impact of different stimulus on a biological system (e.g., a biological entity) by observing the differences in the expression of different proteins. The expression of different proteins are identified by incubating a protein band isolated via Western blot with an antibody. Western blot can be a highly specific test for protein analysis; however, Western blot can be a low throughput technique and that can demand a large amount of sample and expensive antibodies. Furthermore, Western blots are labor intensive and demand a high level of skill on the part of the user executing the Western blot.

The use of fluorophore-conjugated antibodies and advances in digital imaging have partially overcome the low throughput technique and can allow for some multiplex analysis and quantitation. Even with these advances, however, analysis is still limited to two or three proteins at a time. Further, these techniques can use custom gel formulations, gasket designs, and skilled manual intervention. The complexity of the multiplex Western blot assays can be labor intensive and expensive to operate.

The present disclosure relates to integrating a dispense system at the end of a Western blot workflow by utilizing a computing device coupled to a droplet dispenser (e.g., an inkjet printhead) to deposit a volume of fluid (e.g., antibody fluid) from a reservoir coupled to the droplet dispenser onto a matrix (e.g., a polyacrylamide, an agarose gel, and/or a nitrocellulose membrane). As used herein, the term "reservoir" refers to a container capable of including a reagent within the container. The computing device can include a controller to align the droplet dispenser with a protein band on the matrix and/or a specific area of the matrix and deposit an antibody fluid from the coupled reservoir. As used herein, the term "matrix" refers to a material that can form a structure suitable for the transfer and/or separation of molecules. For example, a matrix can be a nitrocellulose membrane with a protein-binding affinity that can be compatible with a variety of detection methods. Another example of a matrix is a polyacrylamide gel which can separate molecules of proteins by size and/or charge through the polyacrylamide matrix.

The droplet dispenser can be equipped with and/or coupled to sensors (e.g., optical sensor, camera, spectrometer, illuminance detection, temperature sensor, humidity sensor, etc.). For example, an optical sensor can be a device that can convert light rays into an electronic signal. Optical sensors can generate a signal that is readable by a computing device responsive to contact-less detection of the optical sensor. The droplet dispenser can use the sensors to identify a protein band on the matrix, determine the location of the protein band on the matrix, align the droplet dispenser with the protein band, and/or determine the status of antibody fluid deposited on the matrix (e.g., determine the completion of an analytical process).

Examples of the present disclosure include the droplet dispenser depositing a fluidic barrier on the matrix such that more than one antibody fluid droplet can be deposited on an individual protein band without contamination or merging of different antibody fluids. The fluidic barrier can be a hydrophobic area deposited from the droplet dispenser. The droplet dispenser can be aligned to deposit a first antibody fluid onto a first portion of the protein band, and the droplet dispenser can be further aligned to deposit a second antibody fluid onto a second portion of the protein band, where the first portion and the second portion are separated by the fluidic barrier. In this way, multiple antibodies can be tested on an individual protein band without adding additional equipment, additional cost, or additional time.

In another example of the present disclosure, the droplet dispenser can refrain from depositing a first antibody fluid on a first protein band and instead deposit the first antibody fluid on a second protein band. The decision to selectively deposit a first and/or a second antibody fluid can be based in part on the knowledge of the proteins isolated from the biological system. For example, if it is known that a biological system includes a first protein band that does not react (e.g., bind) with a first antibody fluid, the droplet dispenser can refrain from depositing the first antibody fluid onto the first protein band. In this way, reagent such as antibody fluids can be selectively positioned onto selected protein bands. This can increase precision and save time and cost.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

As used herein, designators such as "B", "M", "N" "P," "Q", "R", and "T", etc., particularly with respect to reference numerals in the drawings, indicate that any quantity of the particular feature so designation can be included. It is also to be understood that the terminology used herein is for the purpose of describing particular examples only and is not intended to be limiting. As used herein, the singular forms "a" "an," and "the" can include both singular and plural referents, unless the context clearly dictates otherwise.

Figure 1:
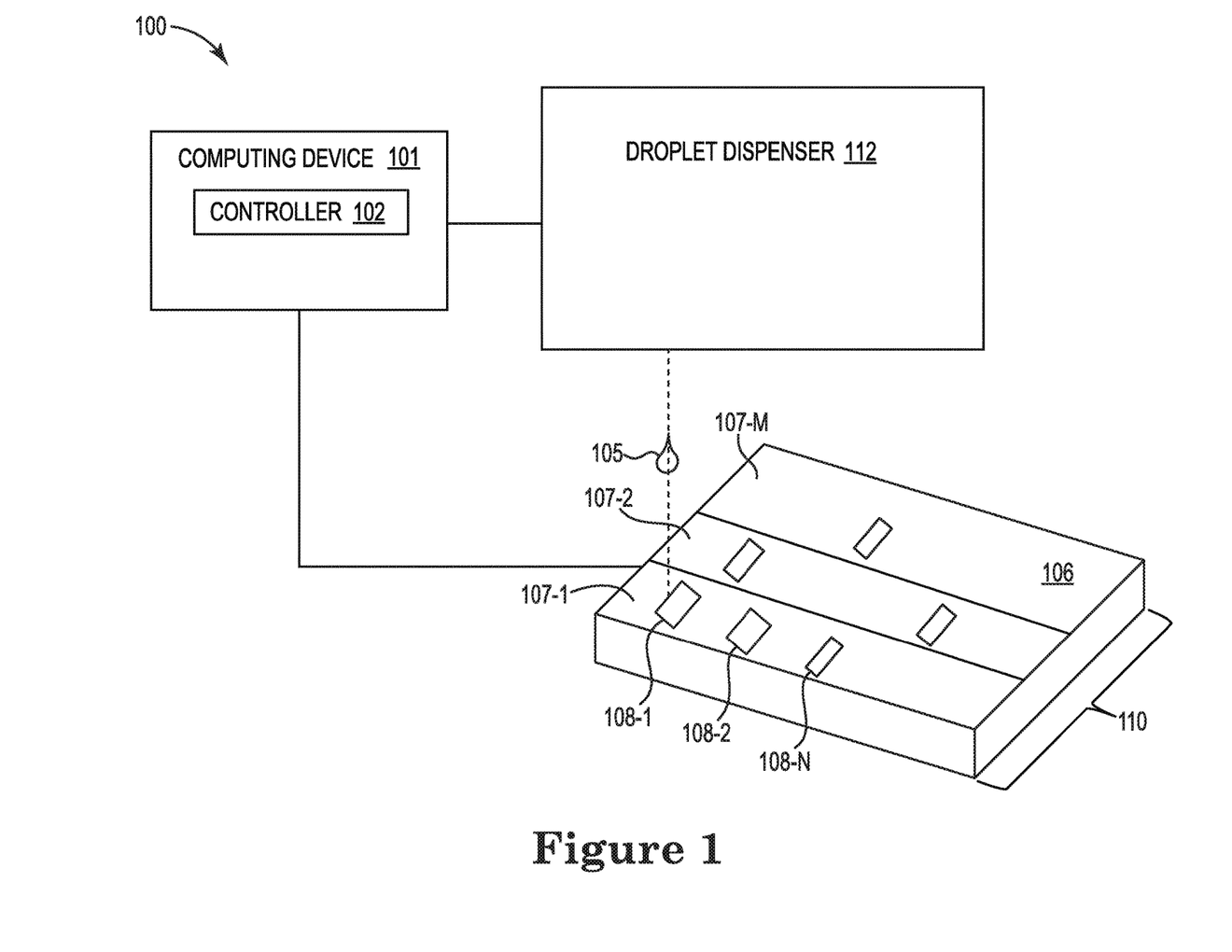
FIG. 1 is an example computing device and a droplet dispenser for antibody fluid deposits consistent with the present disclosure.

FIG. 1 is an example computing device 101 and a droplet dispenser 112 for antibody fluid deposits consistent with the present disclosure. FIG. 1 illustrates an example apparatus in the form of a computing device 101, The system 100 illustrates a computing device 101 which can include resources such as a processor and memory. For example, the computing device 101 may include a controller 102, The controller 102 can be coupled to a droplet dispenser 112. The droplet dispenser 112 can include a plurality of reservoirs (not illustrated as to not obscure examples of the disclosure) which can contain a fluid. As used herein, the term "fluid" refers to a substance that can be deposited by a droplet dispenser. Some examples of fluids that can be contained in a reservoir include an antibody fluid, a fluidic barrier, a washing buffer (e.g., reagents), a stain (e.g., a generic visualization stain), etc. For example, the droplet dispenser 112 can include multiple antibody fluids, a hydrophobic fluid for a fluidic barrier, different concentrations of antibody fluids, reagents, stains, and combinations thereof. The droplet dispenser 112 can deposit a fluid as a droplet 105. The droplet dispenser 112 can deposit the droplet 105 from a reservoir onto a protein band 108-1, 108-2, and/or 108-N which are separated onto the matrix 106 positioned on a stage 110.

The protein bands 108-1, 108-2, and 108-N can be collectively referred to herein as the protein bands 108 or the protein band 108. Some of the protein bands 108 of the matrix 106 are not marked with an identifier as to not obscure examples of the disclosure. The protein bands 108 are each within a lane 107-1, 107-2, and 107-M. For example, the protein bands 108-1, 108-2, and 108-N are separated protein bands from the sample that was loaded into the lane 107-1.

In some examples, the lanes 107-1, 107-2, and 107-M can each contain a different sample (e.g., a different biological system). In other examples, each lane 107-1, 107-2, and 107-M can include the same sample (e.g., biological system) and antibody fluids can be used to precision the immunoblot array.

The samples can be loaded into their respective lanes 107 and the protein bands 108 can be separated into the matrix 106 using a protocol such as that for a Western blot. The matrix 106 can be transferred to a stage 110 such that the droplet dispenser 112 can be positioned with the stage 110 to align a droplet 105 of antibody fluid (or other fluids) onto a portion of a protein band 108. The droplet dispenser 112 can deposit multiple antibody fluids onto an individual protein band 108 and thereby increasing the quantity of tests that can be performed on the matrix 106.

For example, the controller 102 can be communicatively coupled to a droplet dispenser 112 to deposit antibody fluid onto a matrix 106 of an immunoblotting array. The controller 102 can align the droplet dispenser 112 with a protein band 108-1 included in the matrix 106 and instruct the droplet dispenser 112 to deposit a first antibody fluid on to the protein band 108-1 of the matrix 106. The controller 102 can instruct the droplet dispenser 112 to deposit a second antibody fluid on to the protein band 108-1 of the matrix 106 adjacent to the first antibody fluid.

As used herein, "communicatively coupled" refers to various wired and/or wireless connections between devices such that data and/or signals may be transferred in various directions between the devices. The controller 102 and/or the computing device 101 can transmit control signals to the droplet dispenser 112 and/or the stage 110 related to an operation of the stage 110. The controller 102 and/or the computing device 101 can receive information from stage 110 or the matrix 106 (via an imaging system described in connection with FIG. 2), the droplet dispenser 112 and/or the protein bands 108.

The controller 102 can control the movement and operation stage 110, the droplet dispenser 112, or both. The stage 110 can be communicatively coupled to the controller 102 to support the matrix 106 of the immunoblotting array, where the stage 110 is moveable to align the matrix 106 with the droplet dispenser 112. The controller 102 can be a component of the computing device 101 such as a processor, an application specific integrated circuit (ASIC), a field programmable gate array (FPGA), a metal-programmable cell array (MPCA), or other combination of circuitry and/or logic to orchestrate execution of machine-readable instructions.

The droplet dispenser 112 can be a modified inkjet printhead. In an example, this modified inkjet printhead is a thermal inkjet (TIJ) which uses a heating resistor to form an ejection bubble to propel a liquid droplet. In another example, the droplet dispenser 112 (e.g., the modified inkjet printhead) is a piezoelectric inkjet (PIJ) which uses a piezoelectric actuator to eject the droplet.

The droplet dispenser 112 can alter the droplet 105 to a particular volume to be deposited onto the matrix 106 when instructed by the controller 102. For example, based on the immunoblotting array, the droplet 105 can be customized by the droplet dispenser 112 to deposit a precise volume. Some immunoblotting arrays utilize small volumes (e.g., pico, nano, and/or micro liters) of antibody fluid.

The controller 102 can move the droplet dispenser 112 to a position that is aligned with a protein band 108 of the matrix 106. In some examples, a user of the droplet dispenser 112 can be prompted to place the matrix 106 in a predetermined position and/or orientation relative to the stage 110. For example, the predetermined position can be prompted to the user by utilizing pre-placed markings on the stage 110 which can direct the user to position the matrix 106 on the stage 110. In another example, instead of or in addition to the pre-placed markings on the stage 110, a physical protrusion and/or indentation on the stage 110 can prevent incorrect placement of the matrix 106 on to the stage 110.

As mentioned herein, the droplet dispenser 112 can be equipped with sensors to determine the alignment of the droplet dispenser 112 with the protein band 108. The controller 102 can cause the stage 110 and/or the droplet dispenser 112 to move to align the droplet dispenser 112 with a protein band 108. For example, the droplet dispenser 112 can align with protein band 108-1 to deposit droplet 105. The position of the droplet 105 on the protein band 108-1 can be confirmed by the controller 102 and the droplet dispenser 112 by utilizing an optical sensor as will be described in herein.

For example, the controller 102 can be communicatively coupled to an imaging system and/or an optical sensor, where a first and a second antibody fluid are deposited on the matrix 106 on different positions of the protein band 108-1 based on the optical sensor. Said differently, an optical sensor coupled to the controller, the optical sensor to determine a location of the protein band on the matrix to align the droplet dispenser with the protein band. Specifically, an optical sensor can be communicatively coupled to the controller 102 to determine a location of the protein band 108-1, where the second antibody fluid is deposited adjacent to the first antibody fluid responsive to the optical sensor determining the location of the protein band 108-1.

In some examples, the droplet dispenser 112 and/or a reservoir coupled to the droplet dispenser 112 can include a generic protein stain which can be deposited onto the matrix 106 to identify (e.g., visualize) the location of the protein bands 108. For example, the controller 102 can instruct the droplet dispenser 112 to deposit a generic protein stain onto the matrix 106, where the generic protein stain can couple to the protein band 108-1. The controller 102 can further determine the location of the protein band 108-1 responsive to the optical sensor identifying the generic protein stain coupled to the protein band 108-1.

As mentioned, the controller 102 can deposit a fluidic barrier on the matrix 106 of the immunoblotting array, where the fluidic barrier is hydrophobic. For example, the controller 102 can instruct the droplet dispenser 112 to deposit the fluidic barrier on the protein band 108-1 to form a pattern. In this example, the pattern can separate a first antibody fluid from a second antibody fluid on the matrix 106. Using this method, multiple different antibodies and/or multiple concentrations of antibodies can be tested on an individual protein band 108-1.

In a non-limiting example, the droplet dispenser 112 can deposit droplets (e.g., the droplet 105), where each droplet covers a fraction of the protein band 108-1. For instance, a 1 millimeter (mm) band can fit 10 portions suitable for an antibody fluid droplet (e.g., the droplet 105) with a 50 µm separation between each portion. A matrix 106 of an immunoblotting array that includes a 26 pin comb (e.g., 26 lanes 107) on an 8.7 centimeter (cm) gel (e.g., an 8.7 cm matrix 106) can yield about 3 mm protein bands. As such, this method described herein can utilize 30 different antibody combinations and/or conditions (e.g., different antibodies, different concentrations of antibodies, temperature, humidity, etc.) on an individual protein band. Further, the system described herein can allow for the addition of external proteins or the use of internal housekeeping proteins for normalization without having competitive binding concerns. While specific numbers are described herein, the number of lanes, sizes of matrixes 106, etc. can be greater than or less than described by example.

Figure 2:
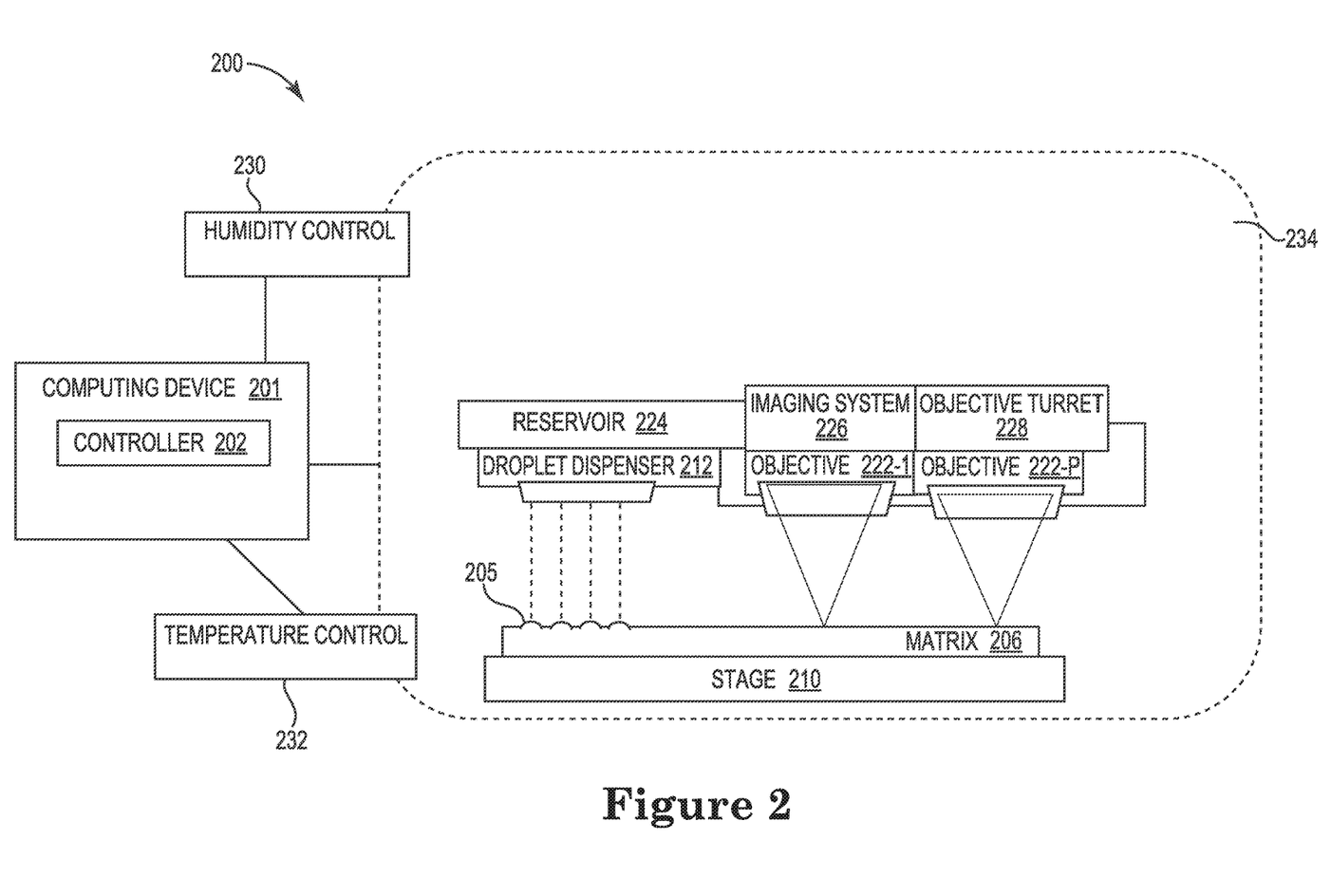
FIG. 2 is an example system including a computing device and a droplet dispenser for antibody fluid deposits consistent with the present disclosure.

FIG. 2 is an example system 200 including a computing device 201 and a droplet dispenser 212 for antibody fluid deposits consistent with the present disclosure. FIG. 2 illustrates a computing device 201 that includes a controller 202, The controller 202 can be communicatively coupled to a humidity control 230, a temperature control 232, and/or a droplet dispenser 212. The droplet dispenser 212 can be coupled to a reservoir 224 and be communicatively coupled to an imaging system 226, an objective turret 228, and/or objectives 222-1 to 222-P. The droplet dispenser 212 can deposit droplets 205 onto the matrix 206 supported by a stage 210. An enclosure 234 can enclose the system 200 such that temperature and humidity can be controlled by the controller 202 and/or the computing device 201.

As mentioned herein, the reservoir 224 can be multiple reservoirs that can contain different fluids such as antibody fluids, different concentrations of antibody fluids, generic protein stains, washing buffers, normalization housekeeping proteins, and/or fluidic barrier fluid. The system 200 can automate the registration of the position of the matrix 206 relative to the droplet dispenser 112 to dispense the multiplexed antibody fluids onto the bands (e.g., the bands 108 of FIG. 1) and visualize the results.

For example, the imaging system 226 can provide an optical sensor (e.g., a visualizer, a camera, etc.) and a microscope including the objectives 222-1 to 222-P. The imaging system 226 can use the objectives 222-1 to 222-P to perform several tasks. For example, the imaging system 226 can provide bright field imaging where the stage 210 can be illuminated from above to result in the imaging of the protein bands included on the matrix 206. Alternatively, illumination of the stage 210 can be provided from below the stage, or from the side at an arbitrary angle of incidence by a light source external to the imaging system 206.

The imaging system 226 can provide the visualization of electrophoresis bands (e.g., ultraviolet and/or fluorescence) when the matrix 206 is an electrophoresis matrix 206. The objectives 222-1 and/or 222-P can include low magnification objectives (e.g., 1×, 2×, etc.) for a larger field of view (e.g., several mm). The light source, included in the imaging system 206, in the objectives 222-1 to 222-P or external, can include light emitting diode (LED) sources, laser sources, and/or lamps in several spectral ranges, for example in the ultraviolet wavelength range to stimulate fluorescence.

The imaging system 226 can provide visualization of the droplet dispenser 212 and calibration droplets on a blank (e.g., unoccupied by a protein band) area of the matrix 206 so that the computing device 201 can register the matrix 206. As used herein, the term "register" refers to the computing device 201 determining the position of the matrix 206. In some examples, the computing device 201 can register that the matrix 206 is at a particular orientation. In some examples the objectives 222-1 to 222-P can include a higher magnification objective (e.g. 5×, 10×, 20×) to locate dispensed droplets 205 of reference stain/markers with <10 µm resolution.

The imaging system 226 can provide visualization of antibody binding results (e.g., visible light and/or fluorescence). In some examples, the imaging system 226 can provide multiple fluorescent channels for optical multiplexing and the objectives 222-1 to 222-P can include higher magnification objective (e.g. 5×, 10×, 20×) to resolve spatially multiplexed results with <10 µm resolution.

Switching between objectives 222-1 and/or 222-P to obtain different magnification can be performed with a motorized turret 228 and/or by utilizing infinity-corrected microscope objectives. In some examples, up to four fluorescence channels can be obtained by inserting dichroic mirrors in the infinity space, each channel including a tube lens and imaging array, or by sequentially switching dichroic filter cubes in the infinity space on a single imaging path. In other examples, multiplexing can be achieved by using an array of multiple imaging systems 206, In other examples, to support a range of imaging processes, the objectives 222-1 to 222-P can be anti-reflection coated for 400-700 µm spectral range or 350-1300 µm.

The controller 202 can utilize the humidity control 230 and/or the temperature control 232 to change the conditions of the enclosure 234 based on the immunoblot assay specifications. For example, the humidity control 230 can control the relative humidity in the enclosure 234. In addition to or instead of, the controller 202 can alter the temperature of the area within the enclosure 234 using the temperature control 232, This can change the temperature within the enclosure 234. The variables of the humidity and temperature within the enclosure 234 can impact the incubation and/or binding of the antibody fluid deposited on the matrix 206 by the droplet dispenser 212.

The multiplexing of multiple antibody fluids onto an individual protein band as described by the examples of FIGS. 1 and 2 can provide a high throughput immunoblot array. Controlling other variables such as humidity and temperature can increase the testing capabilities of the system 200.

Figure 3:
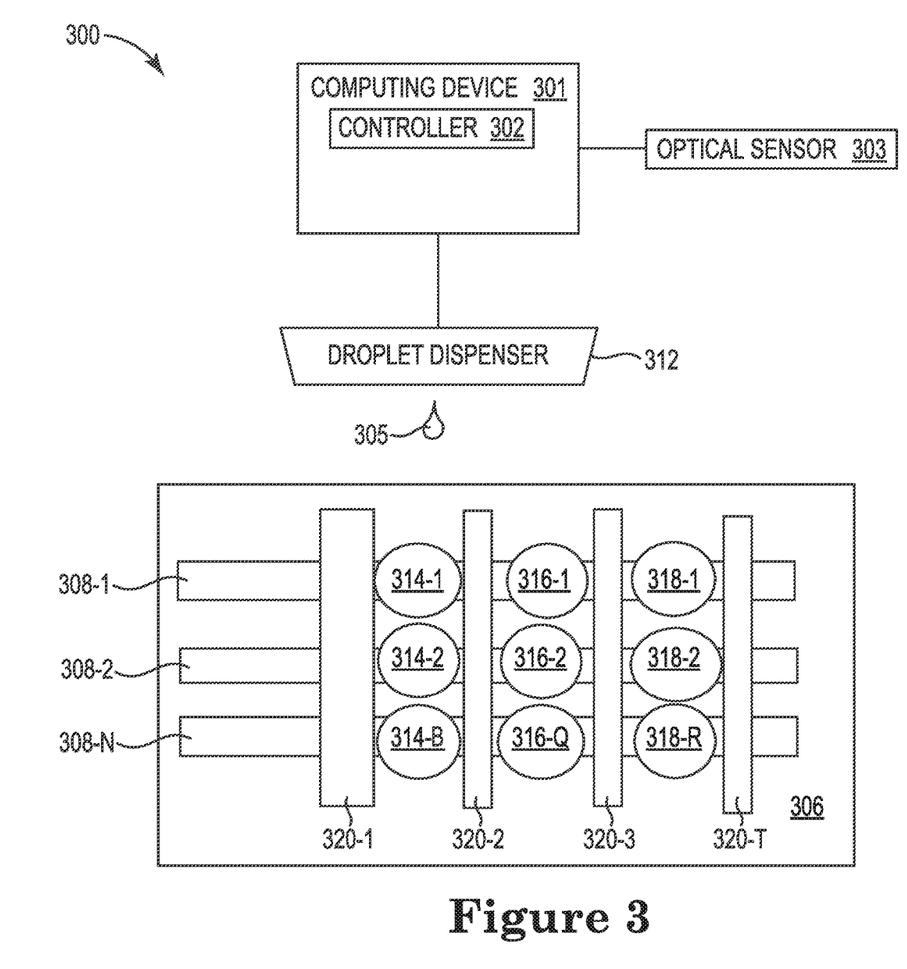
FIG. 3 is an example droplet dispenser for antibody fluid deposits consistent with the present disclosure.

FIG. 3 is an example droplet dispenser 312 for antibody fluid deposits consistent with the present disclosure. The system 300 illustrated in FIG. 3 includes a computing device 301 that includes a controller 302 and is communicatively coupled to an optical sensor 303. While an optical sensor 303 is described herein with examples of FIG. 3, other portions of an imaging system (e.g., the imaging system 226 of FIG. 2, the objectives 222, etc.) may be included as well. The computing device 301 can be coupled to a droplet dispenser 312 to deposit droplets 305 onto a matrix 306 of an immunoblotting array. The matrix 306 can include protein bands 308-1, 308-2, and 308-N which may have been isolated from a biological system of during an immunoblotting assay such as a Western blot and are analogous to the protein bands 108 described in connection with FIG. 1.

The droplet 305 can be different fluids that can be included in reservoirs (e.g., the reservoirs 224 of FIG. 2). For example, the droplet 305 can be of a first antibody fluid 314-1, 314-2, 314-B which can be collectively referred to as the first antibody fluid 314. The droplet 305 can be of a second antibody fluid 316-1, 316-2, 316-Q which can be collectively referred to as the second antibody fluid 316. The droplet 305 can be of a third antibody fluid 318-1, 318-2, 318-R which can be collectively referred to as the third antibody fluid 318. The first antibody fluid 314, the second antibody fluid 316, and/or the third antibody fluid 318 can be different concentrations of the same antibody, different antibodies, or combinations thereof.

In some examples, the droplet dispenser 312 can deposit a fluidic barrier 320-1, 320-2, 320-3, and 320-T in a pattern to prevent the first antibody fluid 314, the second antibody fluid 316, and/or the third antibody fluid 318 from contamination via bleeding (e.g., diffusion of the respective antibody fluids). The droplet dispenser 312 can align with a protein band 308 to deposit fluid during an immunoblotting assay.

For example, a computing device 301 can include a controller 302. The controller 302 can be coupled to the computing device 301 and a droplet dispenser 312 to deposit a plurality of antibody fluids 314, 316, and 318 onto a matrix 306, where the matrix 306 is included as part of an immunoblotting array. An optical sensor 303 can be communicatively coupled to the computing device 301 to determine a location of a protein band 308-1 on the matrix 306 and align the droplet dispenser 312 with the location of the protein band 308-1. The controller 302 can cause the droplet dispenser 312 to deposit a first antibody fluid 314-1 onto the protein band 308-1 responsive to the alignment of the droplet dispenser 312 with the location of the protein band 308-1, and deposit a second antibody fluid 316-1 onto the protein band 308-1 adjacent to the first antibody fluid 314-1 responsive to the deposit of the first antibody fluid 314-1 being deposited on the protein band 308-1.

The process of the example above can continue for the third antibody fluid 318 and for the other isolated protein bands 308-2 and 308-N. In this way, the immunoblot array can be multiplexed with multiple different conditions. For example, the first antibody fluid 314-1 and the second antibody fluid 316-1 can be different antibodies. In other examples, the first antibody fluid 314-1 can be a first concentration of a particular antibody and the second antibody fluid 316-1 can be a second concentration of the particular antibody. The alignment of the protein band 308-1 and the droplet dispenser 312 can be accomplished with a stage (e.g., the stage 110 of FIG. 1).

For example, a stage can be coupled to the computing device 301 and the droplet dispenser 312, where the stage supports the matrix 306 can align the droplet dispenser 312 and the protein band 308-1. The controller 302 can receive a signal from the optical sensor 303 responsive to the optical sensor 303 determining the location of the protein band 308-1 and cause the stage to move to a position such that the protein band 308-1 on the matrix 306 is aligned with the droplet dispenser 312. As used herein, the term "signal" refers to an electrical indication which can be transmitted and received by the controller 302 and/or the computing device 301.

In some examples, the droplet dispenser 312 can deposit a generic visualization stain on the matrix 306. A generic visualization stain can bind to the protein bands 308 such that the droplet dispenser 312 can align with the protein bands 308-1. The optical sensor 303 can detect the location of the protein bands 308 responsive to the binding of the generic visualization stain.

While the protein bands 308-1, 308-2, and 308-N are illustrated in FIG. 3, they represent protein bands isolated from an individual sample and are pictured as an individual lane (e.g., the lanes 107 of FIG. 1). As mentioned herein, there can be more than one sample. For example, some matrix formats include 26 lanes for 26 samples.

Figure 4:
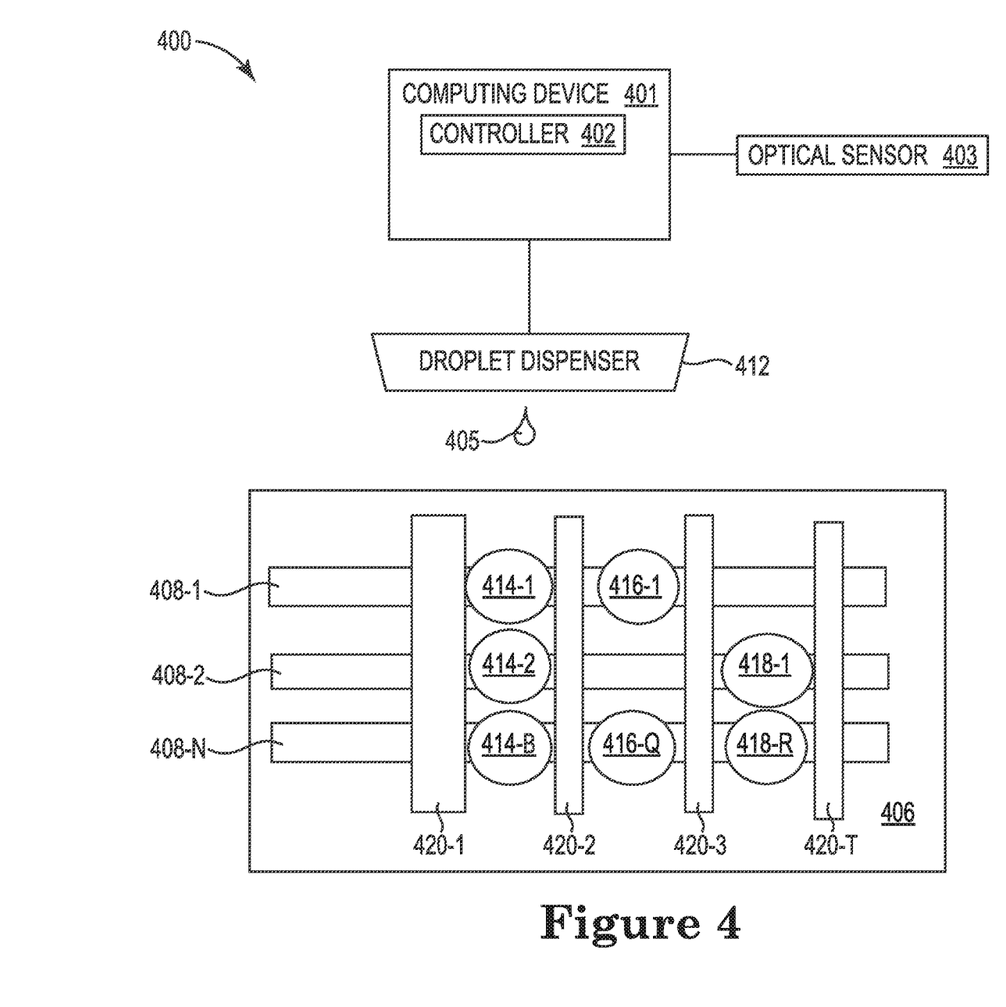
FIG. 4 is another example droplet dispenser for antibody fluid deposits consistent with the present disclosure.

FIG. 4 is another example droplet dispenser 412 for antibody fluid deposits consistent with the present disclosure. The system 400 illustrated in FIG. 4 includes a computing device 401 that includes a controller 402 and is communicatively coupled to an optical sensor 403. While an optical sensor is described herein with examples of FIG. 4, other portions of the imaging system (e.g., the imaging system 226 of FIG. 2) may be included as well. The computing device 401 can be coupled to a droplet dispenser 412 to deposit droplets 405 onto a matrix 406 of an immunoblotting array. The matrix 406 can include protein bands 408-1, 408-2, and 408-N which may have been isolated from an immunoblotting assay such as Western blot and are analogous to the protein bands 108 described in connection with FIG. 1.

The droplet 405 can be different fluids that can be included in reservoirs (e.g., the reservoirs 224 of FIG. 2). For example, the droplet 405 can be of a first antibody fluid 414-1, 414-2, 414-B which can be collectively referred to as the first antibody fluid 414. The droplet 405 can be of a second antibody fluid 416-1, and 416-Q which can be collectively referred to as the second antibody fluid 416. The droplet 405 can be of a third antibody fluid 418-1, 418-R which can be collectively referred to as the third antibody fluid 418. The first antibody fluid 414, the second antibody fluid 416, and/or the third antibody fluid 418 can be different concentrations of the same antibody, different antibodies, or combinations thereof.

In some examples, the droplet dispenser 412 can deposit a fluidic barrier 420-1, 420-2, 420-3, and 420-T in a pattern to prevent the first antibody fluid 414, the second antibody fluid 416, and the third antibody fluid 418 from contamination via bleeding. The droplet dispenser 412 can align with a protein band 408 to deposit fluid during an immunoblotting assay.

In some examples, some information may be known about a biological system. The protein bands 408-1, 408-2, 408-N are different proteins that have been separated by size within the matrix 406. Each of the proteins 408 can include different characteristics that can result in them binding to some antibody fluids and not others. The examples described herein can selectively deposit antibody fluids onto some protein bands 408 and refrain from depositing antibody fluids onto other protein bands 408 that may be known and/or hypothesized not to bind to the antibody fluid. In this way, resources, time, and money can be reserved by not wasting reagents on areas that are known to not bind.

For example, the controller 402 that includes a controller 402 and is communicatively coupled to a droplet dispenser 412 to deposit a plurality of antibody fluids 414, 416, and 418 onto a matrix 406, where the matrix 406 is included as part of an immunoblotting array. An optical sensor 403 can be communicatively coupled to the computing device 401 to determine a location of a protein bands 408-1, 408-2, and 408-N on the matrix 406 and align the droplet dispenser 412 with the location of the protein bands 408-1.

The controller 402 can cause the droplet dispenser 412 to deposit a first antibody fluid 414-1 onto the protein band 408-1 responsive to the alignment of the droplet dispenser 412 with the location of the protein band 408-1. The controller 402 can align the droplet dispenser 412 with the location of the protein band 408-2 and cause the droplet dispenser 412 to deposit a first antibody fluid 414-2 onto the protein band 408-2 responsive to the alignment of the droplet dispenser 412 with the location of the protein band 408-2. The controller 402 can align the droplet dispenser 412 with the location of the protein band 408-N and cause the droplet dispenser 412 to deposit a first antibody fluid 414-B onto the protein band 408-N responsive to the alignment of the droplet dispenser 412 with the location of the protein band 408-N. In this example, it may be known that the protein bands 408-1, 408-2, and 408-N all can possibly bind to the first antibody fluid 414.

In another example, the controller 402 can cause the droplet dispenser 412 to deposit a second antibody fluid 416-1 onto the protein band 408-1 responsive to the alignment of the droplet dispenser 412 with the location of the protein band 408-1, The controller 402 can align the droplet dispenser 412 with the location of the protein bands 408-2 and cause the droplet dispenser 412 to refrain from depositing a second antibody fluid onto the protein band 408-2 responsive to the alignment of the droplet dispenser 412 with the location of the protein band 408-2. The controller 402 can align the droplet dispenser 412 with the location of the protein band 408-N and cause the droplet dispenser 412 to deposit another second antibody fluid 416-Q onto the protein band 408-N responsive to the alignment of the droplet dispenser 412 with the location of the protein band 408-N. In this example, it may be known that the protein band 408-2 does not bind to the second antibody fluid 416.

In yet another example, the controller 402 can cause the droplet dispenser 412 to refrain from depositing a third antibody fluid 418 onto the protein band 408-1 responsive to the alignment of the droplet dispenser 412 with the location of the protein band 408-1. The controller 402 can align the droplet dispenser 412 with the location of the protein band 408-2 and cause the droplet dispenser 412 to deposit a third antibody fluid 418-1 onto the protein band 408-2 responsive to the alignment of the droplet dispenser 412 with the location of the protein band 408-2. The controller 402 can align the droplet dispenser 412 with the location of the protein band 408-N and cause the droplet dispenser 412 to deposit another third antibody fluid 418-R onto the protein band 408-N responsive to the alignment of the droplet dispenser 412 with the location of the protein band 408-N. In this example, it may be known that the protein band 408-1 does not bind to the third antibody fluid 418.

Figure 5:
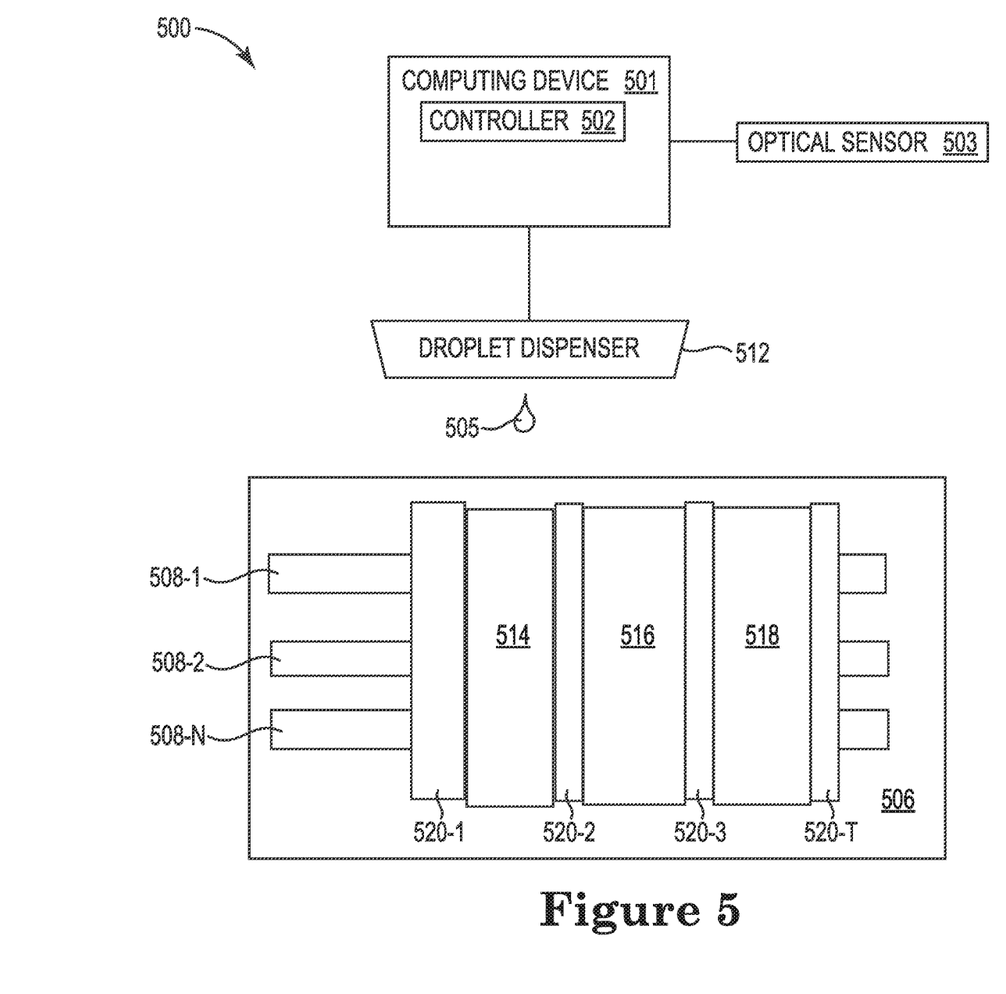
FIG. 5 is another example droplet dispenser for antibody fluid deposits consistent with the present disclosure.

FIG. 5 is another example droplet dispenser 512 for antibody fluid deposits consistent with the present disclosure. The system 500 illustrated in FIG. 5 includes a computing device 501 that includes a controller 502 and is communicatively coupled to an optical sensor 503. While an optical sensor 503 is described herein with examples of FIG. 5, other portions of the imaging system (e.g., the imaging system 226 of FIG. 2) may be included as well. The computing device 501 can be coupled to a droplet dispenser 512 to deposit droplets 505 onto a matrix 506 of an immunoblotting array. The matrix 506 can include protein bands 508-1, 508-2, and 508-N which may have been isolated from an immunoblotting assay such as Western blot and are analogous to the protein bands 108 described in connection with FIG. 1.

The droplet 505 can be different fluids that can be included in reservoirs (e.g., the reservoirs 224 of FIG. 2). For example, the droplet 505 can be of a first antibody fluid 514, a second antibody fluid 516, or a third antibody fluid 518. The first antibody fluid 514, the second antibody fluid 516, and/or the third antibody fluid 518 can be different concentrations of the same antibody, different antibodies, or combinations thereof.

In some examples, the droplet dispenser 512 can deposit a fluidic barrier 520-1, 520-2, 520-3, and 520-T in a pattern to prevent the first antibody fluid 514, the second antibody fluid 516, and/or the third antibody fluid 518 from contamination via bleeding. The droplet dispenser 512 can align with a protein band 508 to deposit fluid during an immunoblotting assay.

In some examples, some information may not be known about a biological system. For example, in a situation where a sample of a biological system that generated the protein bands 508-1, 508-2, and/or 508-N is unknown, each of the antibody fluids 514, 516, and/or 518 may be tested on the matrix 506 as was described in connection with FIG. 3. In another example, the sample that generated the protein bands 508-1, 508-2, and 508-N may be unknown and the protein bands 508 may not be visible.

For instance, in some immunoblot assays, the optical sensor 503 may not be used. Or, a generic visualization stain may not be utilized to identify the protein bands 508. In this instance, the fluidic barriers 520-1, 520-2, 520-3, 520-T can be deposited by the droplet dispenser 512 in a pattern to prevent contamination and/or bleeding and the droplet dispenser can flood the areas between the fluidic barrier with a respective antibody fluid 514, 516, and/or 518. Said differently, the controller 502 can cause the droplet dispenser 512 to align with the space between the fluidic barrier 520-1 and the fluidic barrier 520-2 and flood the space with the first antibody fluid 514. In this way, without the optical sensor 503 determining where the protein bands 508 are located, the controller 502 can apply the first antibody fluid 514 to the matrix 506.

Similarly, the controller 502 can cause the droplet dispenser 512 to align with the space between the fluidic barrier 520-2 and the fluidic barrier 520-3 and flood the space with the second antibody fluid 516. In this way, without the optical sensor 503 determining where the protein bands 508 are located, the controller 502 can apply the second antibody fluid 516 to the matrix 506. The same method can be applied to the third antibody fluid 518. The controller 502 can cause the droplet dispenser 512 to align with the space between the fluidic barrier 520-3 and the fluidic barrier 520-T and flood the space with the third antibody fluid 518. In this way, without the optical sensor 503 determining where the protein bands 508 are located, the controller 502 can apply the third antibody fluid 518 to the matrix 506. Using this method, time can be saved by precisely positioning multiple antibody fluids across the same individual protein bands 508 regardless of their precise locations on the matrix 506.

Figure 6:
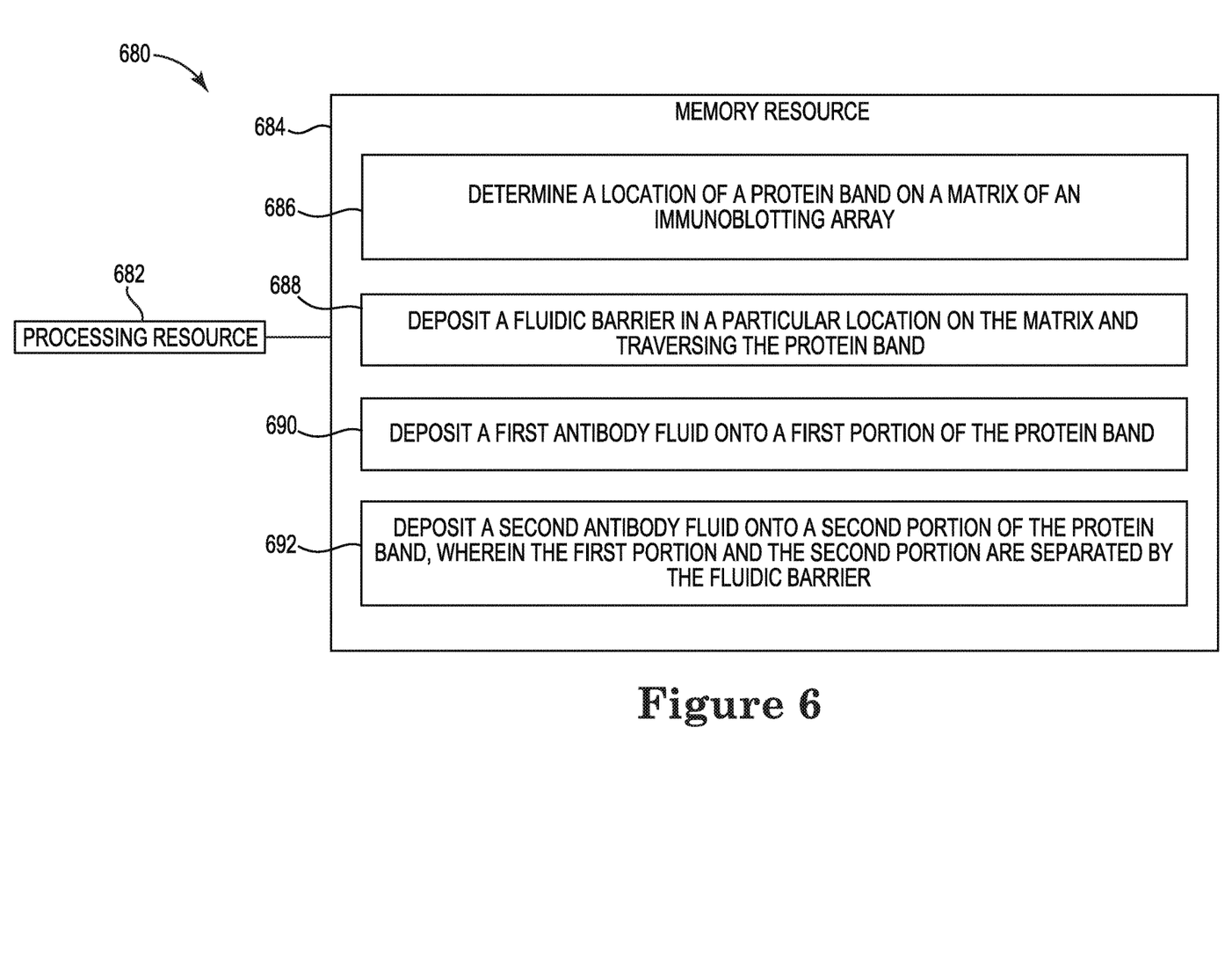
FIG. 6 is an example is a functional diagram representing a processing resource in communication with a memory resource having instructions written thereon for antibody fluid deposits consistent with the present disclosure.

FIG. 6 is an example of a functional diagram representing a processing resource 682 in communication with a memory resource 684 having instructions 686, 688, 690, 692, written thereon for array droplet manipulations consistent with the present disclosure. The processing resource 682, in some examples, can be analogous to the controller 102 describe with respect to FIG. 1. The instructions 686, 688, 690, and 692 are executable by the processing resource 682.

A system 680 can be a server or a computing device (among others) and can include the processing resource 682. The system 680 can further include a non-transitory machine readable medium (e.g., a memory resource 684), on which may be stored instructions, such as instructions 686, 688, 690, 692. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 684 may be electronic, magnetic, optical, or other physical storage device that stores executable instructions. Thus, non-transitory machine readable medium (e.g., a memory resource 684) may be, for example, a non-transitory MRM comprising Random Access Memory (RAM), an Electrically-Erasable Programmable ROM (EEPROM), a storage drive, an optical disc, and the like. The non-transitory machine readable medium (e.g., a memory resource 684) may be disposed within a controller and/or computing device. In this example, the executable instructions 686, 688, 690, and 692 can be "installed" on the device. Additionally, and/or alternatively, the non-transitory machine readable medium (e.g., a memory resource 684) can be a portable, external or remote storage medium, for example, that allows the system 680 to download the instructions 686, 688, 690, and 692 from the portable/external/remote storage medium. In this situation, the executable instructions may be part of an "installation package". As described herein, the non-transitory machine readable medium (e.g., a memory resource 684) can be encoded with executable instructions for array droplet manipulations.

The instructions 686, when executed by a processing resource such as the processing resource 682, can include instructions to determine a location of a protein band on a matrix of an immunoblotting array. The location can be determined by a predetermined instruction included in the non-transitory machine readable medium (e.g., a memory resource 684). In another example, the location can be determined by a generic visualization stain being utilized on the matrix and visualized by an optical sensor communicatively coupled to the processing resource. The instructions when executed by a processing resource such as the processing resource 682 can include instructions to deposit a fluid. As used herein, the term "instruction to deposit" refers to executable instructions stored by the non-transitory machine readable medium (e.g., a memory resource 684) than when executed can cause the droplet dispenser to deposit a fluid.

The instructions 688, when executed by a processing resource such as the processing resource 682, can include instructions to deposit a fluidic barrier in a particular location on the matrix and traversing the protein band. The fluidic barrier can be a hydrophobic fluid that is deposited on the matrix by a droplet dispenser. In this example, the droplet dispenser is an inkjet print head. The fluidic barrier can prevent antibody fluids from bleeding into one another and causing contamination.

The instructions 690, when executed by a processing resource such as the processing resource 682, can include instructions to deposit a first antibody fluid onto a first portion of the protein band. The first portion of the protein band can be defined by the fluidic barrier. In this way, multiple antibody fluids can be deposited on an individual protein band.

The instructions 692, when executed by a processing resource such as the processing resource 682, can include instructions to deposit a second antibody fluid onto a second portion of the protein band, wherein the first portion and the second portion are separated by the fluidic barrier. In some examples the matrix can include a plurality of protein bands. In this example, the controller and/or the computing device coupled to the processing resource 682 can include instructions executable to determine a different location of a different protein band on the matrix of the immunoblotting array and the processing resource 682 can cause the droplet dispenser to be aligned with the different location. Because the fluidic barrier traversed the protein bands, antibody fluids can be deposited on the different protein band.

For example, the memory resource may include further instructions to deposit the first antibody fluid onto a first portion of the different protein band; refrain from depositing the second antibody fluid onto a second portion of the different protein band; and deposit a third antibody fluid onto a third portion of the different protein band, wherein the first portion of the different protein band, the second portion of the different protein band, and the third portion of the different protein band are separated by the fluidic barrier.

The above specification, examples and data provide a description of the method and applications and use of the system and method of the present disclosure, Since many examples can be made without departing from the scope of the system and method of the present disclosure, this specification merely sets forth some of the many possible example configurations and implementations.

What is claimed:

1. An apparatus, comprising:
   an immunoblotting array including a protein band;
   a droplet dispenser positioned over the immunoblotting array and comprising a first antibody liquid and a second antibody liquid and
   a controller coupled to the droplet dispenser and the immunoblotting array, the controller comprising a non-transitory machine readable medium comprising instructions, the controller configured to execute the instructions to control the droplet dispenser to deposit antibody liquid on the immunoblotting array, wherein the controller is configured by the instructions to:
   instruct the droplet dispenser to move over the protein band included in the immunoblotting array;
   instruct the droplet dispenser to deposit the first antibody liquid onto the protein band of the immunoblotting array; and
   instruct the droplet dispenser to deposit the second antibody liquid onto a portion of the protein band of the immunoblotting array separate from the first antibody liquid.

2. The apparatus of claim 1, further comprising an optical sensor coupled to the controller, wherein the controller is configured by the instructions to determine a location of the protein band based on signals from the optical sensor, wherein the second antibody liquid is deposited responsive to the optical sensor generating data indicating the location of the protein band.

3. The apparatus of claim 1, further comprising a stage and the immunoblotting array is located on the stage, wherein the controller is configured by the instructions to move the stage to cause the immunoblotting array to be under the droplet dispenser.

4. The apparatus of claim 1, wherein the controller is configured by the instructions to control the droplet dispenser to deposit a hydrophobic area onto the protein band.

5. The apparatus of claim 4, wherein:
the controller is configured by the instructions to control the droplet dispenser to deposit the hydrophobic area onto the protein band to form a pattern separating the first antibody liquid from the second antibody liquid on the protein band.

6. The apparatus of claim 1, further comprising an optical sensor coupled to the controller, the controller configured by the instructions to determine, based on signals from the optical sensor, a location of the protein band on the immunoblotting array to move the droplet dispenser over the protein band.

7. The apparatus of claim 6, wherein the controller is configured by the instructions to:
instruct the droplet dispenser to deposit a generic protein stain onto the immunoblotting array, wherein the generic protein stain couples to the protein band;
receive, from the optical sensor, data indicating the generic protein stain coupled to the protein band; and
determine the location of the protein band based on the data indicating the generic protein stain coupled to the protein band.

8. A system, comprising:
an immunoblotting array including a protein band;
a droplet dispenser positioned over the immunoblotting array and comprising a first antibody liquid and a second antibody liquid; and
a controller coupled to the droplet dispenser and the immunoblotting array, the controller comprising a non-transitory machine readable medium comprising instructions, the controller configured to execute the instructions to control the droplet dispenser to deposit a plurality of antibody liquids onto the immunoblotting array; and
an optical sensor coupled to the controller, the controller configured by the instructions to determine, based on signals from the optical sensor, a location of the protein band of the immunoblotting array and instruct the droplet dispenser to move over the location of the protein band, the controller configured by the instructions to cause the droplet dispenser to:
deposit the first antibody liquid onto the protein band responsive to the droplet dispenser being positioned above the location of the protein band; and
deposit the second antibody liquid onto a portion of the protein band separate from the first antibody liquid responsive to the deposit of the first antibody onto the protein band.

9. The system of claim 8, wherein the first antibody liquid is a first concentration and the second antibody liquid is a second concentration.

10. The system of claim 8, further comprising a stage coupled to the droplet dispenser, wherein the immunoblotting array is located on the stage.

11. The system of claim 10, wherein the controller is configured by the instructions to:
receive a signal from the optical sensor;
determine the location of the protein band based on the signal; and
control the stage to move to a position such that the protein band of the immunoblotting array is below the droplet dispenser.

* * * * *